United States Patent [19]

Holson et al.

[11] Patent Number: 5,437,436
[45] Date of Patent: Aug. 1, 1995

[54] STAND-ALONE GAS SPRING

[75] Inventors: John Holson, Taylor; Frederick R. Waldecker, Livonia, both of Mich.

[73] Assignee: Ni-Tech, Inc., Westland, Mich.

[21] Appl. No.: 110,067

[22] Filed: Aug. 20, 1993

[51] Int. Cl.⁶ ............................................. F16F 9/02
[52] U.S. Cl. ................................... 267/119; 267/130; 92/177; 188/322.17
[58] Field of Search ................ 267/64.11, 64.28, 118, 267/119, 129, 75, 130, 124; 188/322.17, 298; 92/177, 165 PR; 60/456

[56] References Cited

U.S. PATENT DOCUMENTS

| | | | |
|---|---|---|---|
| 3,763,971 | 10/1973 | Saner | 188/322.17 |
| 4,190,076 | 2/1980 | Cameron et al. | 188/298 X |
| 4,342,448 | 8/1982 | Wallis | 188/322.17 X |
| 4,662,616 | 5/1987 | Hennells | 267/64.28 |
| 4,741,518 | 5/1988 | Wallis | 267/75 |
| 4,792,128 | 12/1988 | Holley | 267/118 |
| 5,129,635 | 7/1992 | Holley | 267/129 |
| 5,265,852 | 11/1993 | Taylor | 267/130 X |
| 5,279,371 | 1/1994 | Ekwall et al. | 92/177 X |
| 5,291,974 | 3/1994 | Bianchi | 188/322.17 |

FOREIGN PATENT DOCUMENTS 0446476 9/1991 European Pat. Off. ......... 267/64.11
0024203 3/1981 Japan ..................................... 92/177

Primary Examiner—Robert J. Oberleitner
Assistant Examiner—Peter M. Poan
Attorney, Agent, or Firm—Howard & Howard

[57] ABSTRACT

A self-contained gas spring that has low heat generation characteristics and is easy to manufacture and maintain. The spring includes a bearing and seal assembly that is easy to remove from the cylinder body of the spring. The assembly includes an annular bearing for guiding the piston rod, the bearing is press fit within a bearing cap and, an end cap threaded in to the cylinder body. The end cap includes an annular seal surrounding and tightly engaging the piston rod of the gas spring. The end cap engages the bearing cap when the end cap is fully threaded into the cylinder body to retain the bearing cap within the cylinder body. The seal is formed of two materials, one very flexible, the other very rigid. The gas spring also has a unique piston head that has a hexagonal periphery with upwardly angled sides.

8 Claims, 3 Drawing Sheets

STAND-ALONE GAS SPRING

BACKGROUND

The present invention generally relates to gas cylinder springs and more particularly to a self-contained gas cylinder used to cushion the plenums of a press.

Gas cylinders of the type disclosed in this application typically employ a compressible gas such as nitrogen gas to resist the movement of a piston within a cylinder. These cylinders are generally of two basic types, threaded body and stand alone cylinders. Threaded body cylinders have a cylinder body that is open at one end with a piston rod extending out of the other end. The open end has external threads that permit the spring cylinder to be threaded into a manifold. The manifold generally has a number of threaded openings for receipt of a number of cylinder springs. A supply of nitrogen gas is supplied to the manifold and to the spring cylinders through their open ends.

Stand-alone cylinders are self-contained gas springs. They are charged with a quantity of compressible gas, such as nitrogen gas and then sealed. The stand alone springs are placed in various openings in the plenums of a press to cushion the presses movement.

Both types of gas springs work in the same manner. A piston reciprocates within a cylinder body against a compressible gas, such, for example, nitrogen gas. The cylinder is pre-charged with about 2,000 psi of nitrogen gas. When the piston is forced into the cylinder body, the nitrogen gas is compressed to a maximum pressure of about 3,000 to 5,000 PSI, depending upon the cylinder and piston size.

There are several problems in known gas cylinders. One problem is the springs create heat as they operate which increases wear of the various parts of the cylinder. As should be appreciated, excessive heat reduces the life of gas springs, particularly the life of the seals employed in the springs.

U.S. Pat. No. 4,741,518 discloses a stand alone cylinder that is believed to create large amounts of heat. The piston has an elongated bearing along a majority of the piston that engages the inner wall of the cylinder as the piston reciprocates. This bearing generates heat as the piston reciprocates, which causes the bearing to wear as well as other components and reduces the life of the cylinder.

Other problems result from the very tight tolerances required between the piston and the adjoining parts of the gas cylinder such as for example the bearings used to guide the piston. One reason for the need for tight tolerances is because of the type of seals employed and the need to prevent the seals from creeping or extruding between the piston rod and an adjoining part such as for example the guide bearing.

In the gas spring disclosed in U.S. Pat. No. 5,129,635, relatively little clearance is provided between each rod 16, 18 and its bearings 58, 84. With reference to column 3, lines 47 to 52 of the '635 patent, "[this] clearance is usually about 0.002 to 0.004 of an inch per side or a total clearance of 0.004 to 0.008 of an inch between the diameters of each rod and its associated bearings. To achieve these close tolerances, preferably the bearings are sized after being pressed into their housing." The need to size the bearings after being pressed into their housing is a difficult and expensive process. It also makes maintenance of the cylinder difficult and expensive as well. But it is necessary to have the tight tolerances because, without them, the seals can extrude, resulting in leaks around the seals and excessive wearing of the seals.

SUMMARY OF THE INVENTION

The present invention overcomes the above problems found in existing cylinders and provides a very simple economical gas cylinder.

In the preferred embodiment, the cylinder is a self-contained gas cylinder. The gas cylinder has a cylinder body with a working end through which a piston rod protrudes and a closed end. A piston head reciprocates within the cylinder body to compress a compressible gas.

At least one bearing means is provided to guide the piston within the cylinder body. The bearing is press fit into a bearing cap which is in turn removably mounted in the cylinder body. The bearing has an inner diameter that is slightly larger than the outer diameter of the rod of the piston. But, the size of the inner diameter doesn't require the tight tolerances required of known gas cylinders. Because the tolerances do not need to be as tight, the bearing doesn't have to be sized after it is press fit into the bearing cap. This reduces the manufacturing cost of the cylinder and the cost of normal maintenance of the cylinder.

The reason that the tolerances do not have to be as great is because of the sealing means used in the cylinder. Nitrogen gas cylinders generally require a soft rubber seal to allow for expansion of the seal and therefore enhanced sealing characteristics when the pressure increases within the spring. But, soft rubber springs can creep or extrude between adjacent gaps at increased pressures. Therefore, nitrogen gas springs normally require very close tolerances to prevent the seals from creeping between moving parts.

The sealing means of the present invention is constructed of two materials. The first material is flexible so that under pressure it can expand to enhance sealing of the cylinder. The edges of the flexible portion of the seal normally engage the inner wall of the end cap in which the seal is housed and the exterior of the piston rod. As pressure increases within the cylinder, the flexibility of the first material permits the seal to expand and enhance the sealing characteristic. The first portion has an end face with a concave center that extends outwardly to outer ears. The outer ears are normally compressed against the rod and the interior of the end cap to seal the gas within the chamber. The ears can be further expanded and compressed against the end cap and rod to seal the chamber.

The second portion of the sealing means is relatively inflexible when compared to the first portion. The second portion forms a base and is preferably made of a hard thermoplastic material. This base will not creep or extrude between adjacent gaps. Further, the second portion is adapted to have its sidewalls expand slightly outwardly in response to pressure being applied against the concave center portion of the first material, the soft rubber, to fill the recess in which the seal is mounted to prevent creeping of the soft rubber seal. Because of the unique seal employed, the tolerances within the cylinder do not have to be kept tight, reducing manufacturing and maintenance costs.

The gas cylinder of the present invention also includes a unique piston head that reduces heat within the cylinder during operation. The piston head has a hexagonal shaped periphery and the sides of the periphery are angled to facilitate the free flow of gas around the piston head. In other known cylinders, the piston head is either tightly sealed against the interior wall of the cylinder body with small passages within the head for the gas to flow through, or the piston head is very closely adjacent the cylinder wall with the gas having to squeeze between the cylinder wall and the periphery of the piston. Both of these cylinders create heat which is detrimental to the cylinder. In the cylinder of the present invention, the gas freely passes about the piston head, eliminating or at least greatly reducing heat within the cylinder and greatly increasing the life of the gas cylinder. Also, tight tolerances do not have to be held with respect to the piston head and cylinder wall.

Another advantage of the present invention is the ability to easily replace or repair the bearing or bearings and the seal in the gas spring. The bearing is press fit into a bearing cap and the seal is inserted into an annular end cap. Both the bearing cap and end cap can be easily removed from the cylinder body. The bearing cap sets within the cylinder body against a support ledge and is easy to remove from the cylinder body because it is merely sitting on the ledge. The end cap contains the seal and has threads that mate with internal threads in the cylinder body. The end cap when threaded into the cylinder body engages the bearing cap to hold the bearing cap against the support ledge. It is easily removed by threading it out of the cylinder body. The cylinder is easy to manufacture because the recesses that are needed to hold the bearing and seal are formed in the bearing and end cap. The recesses are more easily formed in the caps than in the interior of the cylinder body. Further, if maintenance is required, the end cap is threaded out of the cylinder body which allows the piston and the bearing cap to be easily removed. Then either new caps with a bearing and a seal can be installed or the bearings and seal in the caps can be replaced and the original caps re-installed.

DETAILED DESCRIPTION OF THE INVENTION

Figure 1:
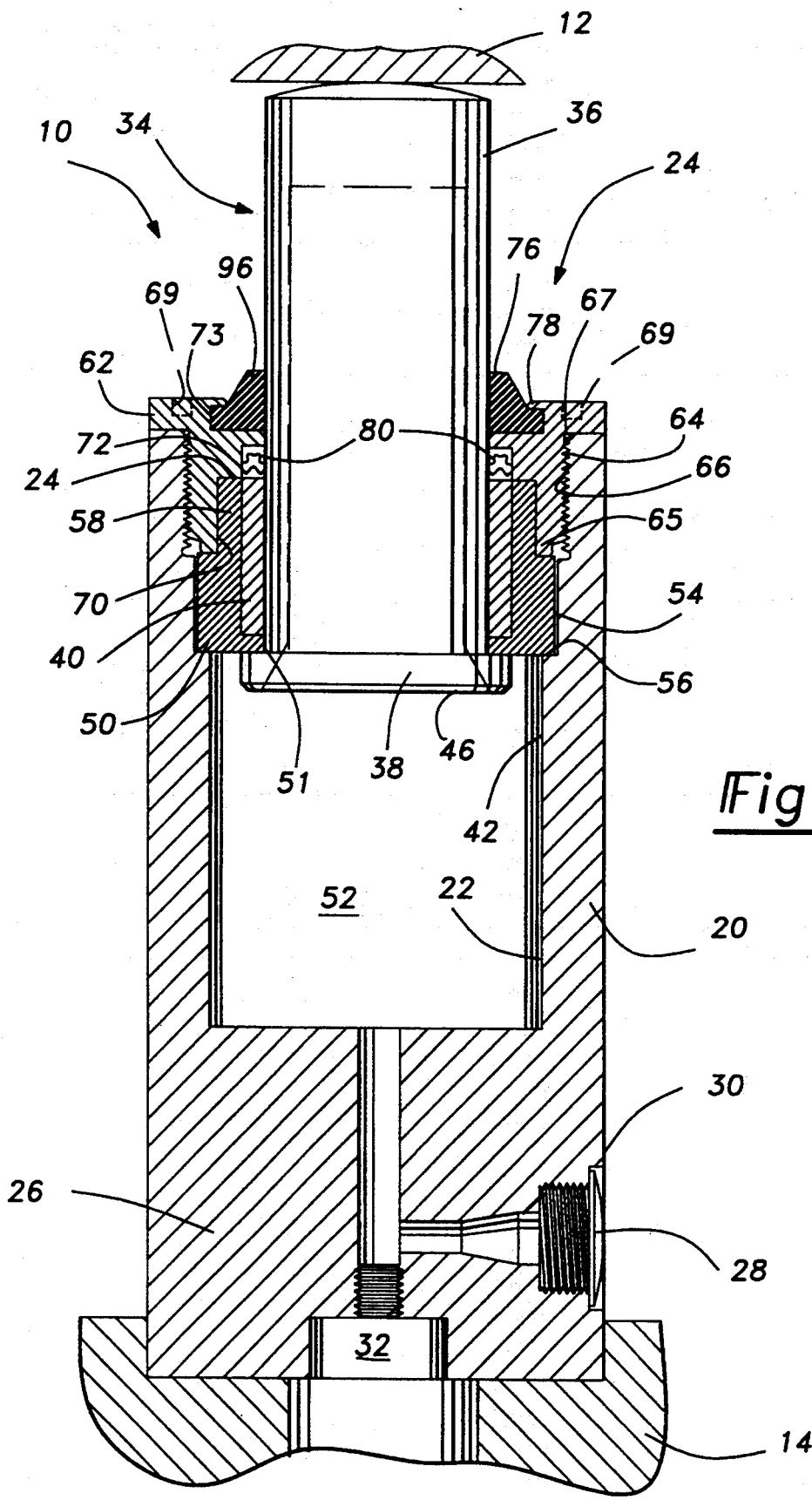
FIG. 1 is a cut-away side view of the gas cylinder of the present invention.

The gas spring of the present invention is shown generally at 10 in FIG. 1. Spring 10 is illustrated between upper and lower plenums 12 and 14 of a press.

Spring 10 includes a cylinder body 20 which defines an interior chamber 22 having an open end 24 and a closed end 26. In the preferred embodiment, the cylinder body 20 is formed as a tube with one end closed at end 26. A fill valve 28 is provided in the sidewall 30 of cylinder body 20 to permit nitrogen gas to be supplied to the spring 10. A rupture plug 32 is mounted within the bottom or closed end 26. Rupture plug 32 is adapted to rupture if the pressure within the spring 10 exceeds a predetermined value.

A piston 34 is reciprocally mounted within the cylinder body 20. The piston 34 has a rod portion 36 and a head 38. The rod 36 extends through a bearing 40 and out of open end 24. The rod 36 engages the bearing 40 to guide the piston 34 within the cylinder body 20. In the preferred embodiment, the bearing 40 is a bronze bushing that is impregnated with oil to lubricate the rod 36 as it reciprocates within the cylinder body 20. Further in the preferred embodiment, the rod has an internal bore which reduces the weight of the rod 36, which reduces the inertia of the piston to reduce damage if the piston bottoms out.

The head 38 of piston 34 is spaced from the inner wall 42 of cylinder body 20 to reduce heat within the spring 10. As should be appreciated, having the periphery of this piston head touching or very close to the inner wall of the cylinder body 20 creates heat as the piston reciprocates. This heat reduces the life of the cylinder and in particular the bearing resulting in down time of the press.

Figure 2:
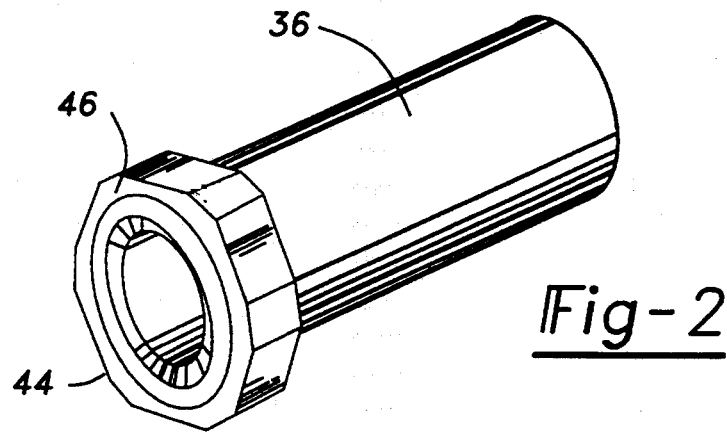
FIG. 2 is a perspective view of the piston viewed in the direction of the piston head.

In the preferred embodiment of the present invention, the head 38 has a hexagonal periphery 44. See FIG. 2. The hexagonal periphery further reduces heat build up within the cylinder because gas is permitted to more freely pass around the head 38 which reduces heat buildup. To further reduce heat, the head 38 has angled sides 46.

The bearing 40 is mounted within a bearing cap 50. The bearing cap 50 is an annular cup shaped member having an opening 51 for receipt of rod 36. Bearing cap 50 is mounted in the cylinder body 20 at open end 24. The interior chamber 22 of cylinder body 20 has a first portion 52 in which the head 38 reciprocates and a second portion 54 which has a larger diameter than first portion 52 for receipt of the cap 50. A step or support ledge 56 is formed at the intersection of the first and second portions 52 and 54. Preferably, the bearing cap 50 merely sits on support ledge 56. Bearing cap 50 has a reduced diameter 58 which can be inserted into the adjoining end 60 of an annular end cap 62 which secures the bearing cap 50 in the cylinder body 20.

Annular end cap 62 is mounted within the open end 24 of cylinder body 20 and rod 36 extends through it. The end cap 62 has external threads 64 on the reduced diameter throat 65 which mate with internal threads 66 in open end 24 of cylinder body 20. Preferably, an O-ring 67 is mounted between the end cap and the cylinder body 20. The end 60 of cap 62 that is inserted into cylinder body 20 has an internal diameter 70 that is large enough to easily accept the reduced diameter 58 of bearing cap 50. In this way, when the annular end cap 62 is threaded into internal threads 66, end 68 engages the bearing cap 48 at the reduced diameter 58 forcing the bearing cap into engagement with support ledge 56 entrapping the bearing cap within the cylinder 20. It should be appreciated by those of ordinary skill in the art that the bearing cap 50 is only loosely received in the end cap 64 so that when repair is required, the two parts can be easily removed and separated. In the preferred embodiment, openings 69 are provided in cap 62 for receipt of a spanner wrench to tighten or loosen the cap 62. As should be appreciated, other methods are available for tightening and loosening cap 62.

The end cap 62 illustrated in FIG. 1 has three internal diameters. The end of cap 62 is formed by counterboring cap 62 to form two internal diameters 70 and 72 which are separated from a third diameter 73 by an integral internal flange 76. Internal diameter 70 is larger than diameter 72 with a small step 74 being formed therebetween. Preferably, when the cap 62 is fully threaded into cylinder 20, the reduced diameter 58 of bearing cap 50 engages step 74 so that the bearing cap and the bearing 40 are fixed within the cylinder body 20.

An annular sealing means 80 is mounted in internal diameter 72 between the step 74 and the flange 76. Seal 80 seals the cylinder 20 so that nitrogen gas from within the cylinder cannot escape from the cylinder. The seal 80 engages the wall of the bearing cap 48 and the rod 36.

Figure 3:
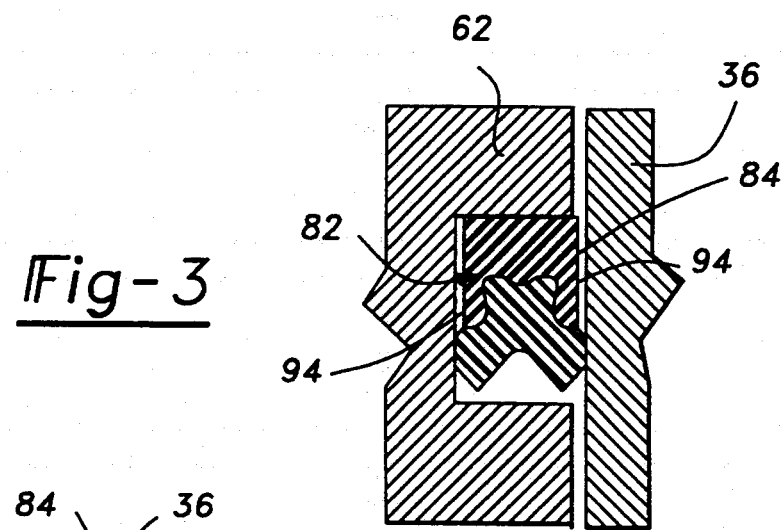
FIG. 3 is a cut-away view of the seal in the end cap actions against the piston rod.
Figure 4:
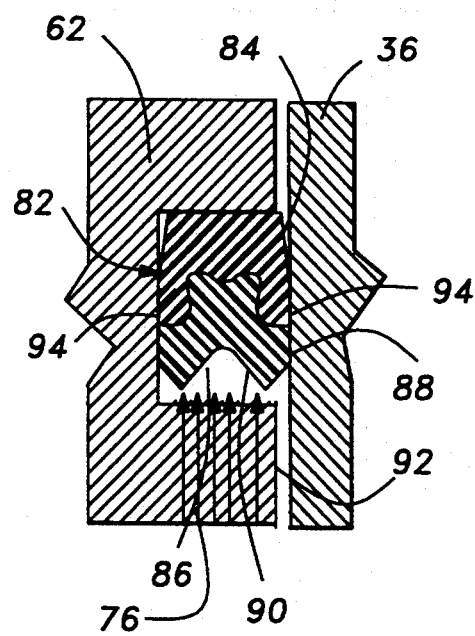
FIG. 4 is a cut-away view of the seal in the end cap acting against the piston rod with the base expanded.

Seal 80 is illustrated in cross section in FIGS. 3 and 4. It is available s from McMasters Koss Company in Royal Oak, Mich. and is called the Z-Seal. The seal 80 includes two sections 82 and 84 that are interconnected together. The first section 82 is made of a resilient soft rubber. The face 86 of section 82 has a generally W-shaped cross-section with ears 88 that extend outwardly and are normally compressed against the wall of end cap 62 and rod 36. The concave portion 90 of seal 80 is adapted to force the ears 88 further outwardly in responce to pressure from within the cylinder 10 that escapes around the bearing 40 to further seal the cylinder 10.

The second section 84 is made of hard thermoplastic which forms a base that resists extrusion of the seal between the flange 76 and the rod 36. As will be appreciated by those of ordinary skill in the art, the gap 92 between flange 76 and rod 36 normally must be very small to prevent extrusion and this requires very precise and costly sizing of these two parts. The present invention doesn't require the precision normally required because of the second section or base 84. As illustrated in FIG. 4, in the preferred embodiment, the second section 84 has fingers 94 that will spread outwardly in response to pressure acting on the soft rubber first section 82 to prevent any extrusion of the first section 82 at elevated pressures.

Mounted within the third diameter 73 is a wiper scraper 96 that wipes the rod 36 as the rod reciprocates within the cylinder 20 to prevent contaminates from entering the cylinder 20. As can be seen, the third diameter 73 has a small flange 78 that extends in the direction of the rod 36 to retain the scraper 96 within the cylinder 20.

Figure 5:
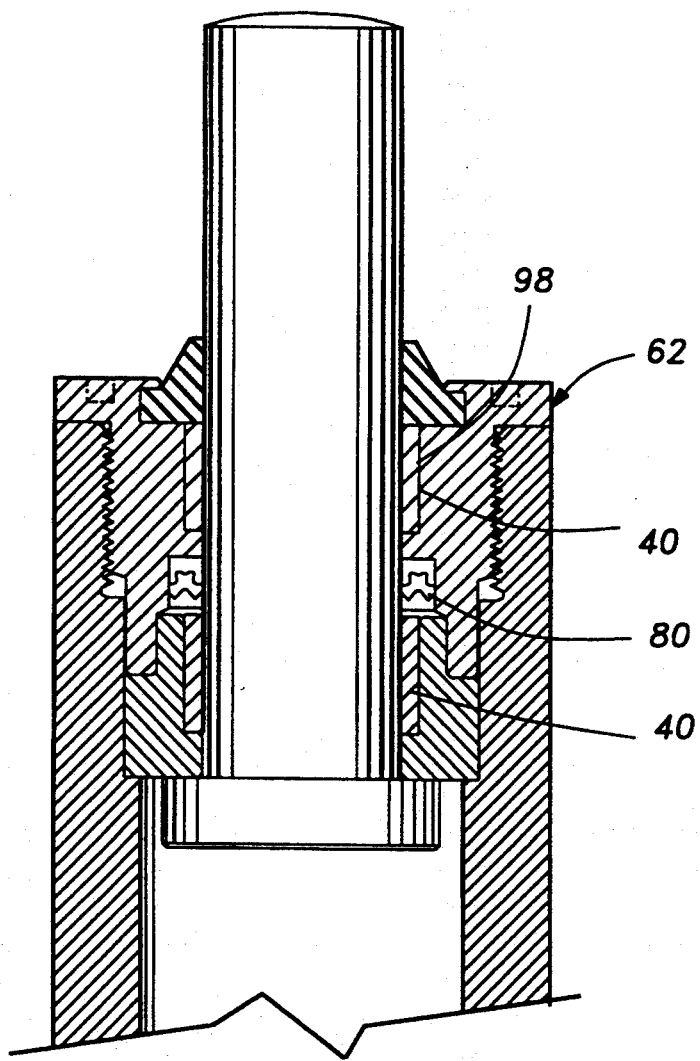
FIG. 5 is a further embodiment of the present invention.

With reference to FIG. 5, a further embodiment of the present invention is illustrated. In this embodiment, there are two bearings 40 for guiding the rod 36. The bearings are spaced from each other in this embodiment with the seal 80 positioned between them. As should be appreciated, the two bearings 40 would be preferable for self-contained cylinders having longer cylinder bodies 20 and pistons 34 with longer rods 36. The spaced bearings 40 facilitate proper guidance of the piston 34 within the cylinder body 20. In this embodiment an additional recess 98 is provided in end cap 62 for receipt of the additional bearing 40.

What is claimed is:

1. A self-contained gas spring for use in cushioning a die press, said spring comprising:
   a cylinder body having an open end and a closed end, said cylinder body defining an interior chamber;
   a bearing means mounted within the interior chamber of said cylinder body;
   a piston having a rod portion and a head, said piston being reciprocally mounted within said interior chamber with said rod extending through said bearing means and out of said open end, said rod engaging said bearing means such that said rod is guided within said interior chamber by said bearing means;
   an annular end cap having an interior wall, said annular end cap being releasably mounted within said open end of said cylinder body, said rod extending through said annual end cap;
   an annular sealing means mounted within said annular end cap, said sealing means engaging said piston rod to prevent gas from escaping from said cylinder body, said sealing means having a first portion facing said closed end and a second portion facing said open end, said first portion being flexible and said second portion being relatively inflexible relative to said first portion, said first and second portions being formed of distinct materials, said first portion having an end face with a concave center extending to outer ears, said outer ears being compressed against said rod and said interior wall of said end cap to seal said gas within said chamber, said second portion being adapted to expand in response to pressure being applied against said first portion to prevent said first portion of said seal from creeping between said rod and said interior wall;
   whereby said gas spring can withstand elevated pressures without said seal failing.

2. The self-contained gas spring of claim 1, wherein said bearing means includes an annular bearing press fit within a bearing cap.

3. The self-contained gas spring of claim 2, wherein said cylinder body includes a support ledge upon which said bearing cap rests.

4. The self-contained gas spring of claim 3, wherein said end cap has external threads and said cylinder body includes interior threads, said end cap being threaded into said cylinder body in abutting relationship with said bearing cap forcing said bearing cap against said support ledge retaining said bearing cap and end cap within said cylinder body.

5. The self-contained gas spring of claim 1, wherein said end cap has external threads and said cylinder body includes interior threads, said end cap being threaded into said cylinder body.

6. The self-contained gas spring of claim 1, wherein said piston head includes a hexagonal shaped periphery to facilitate the free flow of gas around the piston head whereby heat within said cylinder is reduced increasing the life of said gas cylinder.

7. The self-contained gas spring 1, wherein said piston head includes angled sides to facilitate the free flow of gas around the piston head whereby heat within said cylinder is reduced increasing the life of said gas cylinder.

8. The self-contained gas spring 1, wherein said piston head includes a hexagonal shaped periphery with upwardly angled sides to facilitate the free flow of gas around the piston head whereby heat within said cylinder is reduced increasing the life of said gas cylinder.

* * * * *